United States Patent
Jelmert

(10) Patent No.: US 7,169,310 B2
(45) Date of Patent: *Jan. 30, 2007

(54) PROCESS AND APPARATUS FOR THE CONTROL OF UNDESIRABLE ORGANISMS IN A WATER SYSTEM

(75) Inventor: Anders Jelmert, Bergen (NO)

(73) Assignee: MetaFil AS, Hovik (NO)

( * ) Notice: Subject to any disclaimer, the term of this patent is extended or adjusted under 35 U.S.C. 154(b) by 0 days.

This patent is subject to a terminal disclaimer.

(21) Appl. No.: 11/182,012

(22) Filed: Jul. 15, 2005

(65) Prior Publication Data

US 2005/0247645 A1    Nov. 10, 2005

Related U.S. Application Data

(63) Continuation of application No. 10/130,209, filed as application No. PCT/NO00/00385 on Nov. 15, 2000, now Pat. No. 6,921,488.

(30) Foreign Application Priority Data

Nov. 15, 1999   (NO) .................................. 19995582

(51) Int. Cl.
    *C02F 1/00*    (2006.01)
(52) U.S. Cl. .................... 210/739; 210/764; 210/143; 210/220
(58) Field of Classification Search ............... 210/764, 210/220, 739, 143; 95/263; 96/263
    See application file for complete search history.

(56) References Cited

U.S. PATENT DOCUMENTS

| 4,612,021 A | 9/1986 | Bland et al. |
| 5,190,670 A | 3/1993 | Stearns |

(Continued)

FOREIGN PATENT DOCUMENTS

JP    10230247    9/1998

OTHER PUBLICATIONS

Tamburri et al, Ballast Water deoxygenation can prevent aquatic introductions while reducing ship corrosion, Jun. 15, 2001, Biological Conservation, 103(2002) 331-341.*

McMahon et al, Effects of Elevated Carbon Dioxide Concentrations on Survivorship in Zebra Mussels(*Dreissena polymorpha*) and Asian Clams(*Corbicula fluminea*), Center for Biological Macro Fouling Research, pp. 319-332.*

(Continued)

*Primary Examiner*—Robert A. Hopkins
(74) *Attorney, Agent, or Firm*—Rothwell, Figg, Ernst & Manbeck

(57) ABSTRACT

There is described a process for the treatment of water to prevent the survival of unwanted organisms in said water. The process is based on the supply of gas into the water at pressures greater than 1 atmosphere, while ensuring that the mass transport of gas into the water is greater than the mass loss across the air-water (surface) interface, i.e. such that a gas super-saturated condition is established. Further, there is described an apparatus or system for the treatment of a body of water, i.e. to prevent the survival of organisms in said water. A preferable embodiment comprises a compressor which delivers a compressed gas to said water system in an amount sufficient to establish a supersaturated condition in said body of water.

28 Claims, 4 Drawing Sheets

U.S. PATENT DOCUMENTS

| | | | |
|---|---|---|---|
| 5,476,595 | A | 12/1995 | Baddour et al. |
| 5,893,233 | A | 4/1999 | Kaster et al. |
| 5,932,112 | A * | 8/1999 | Browning, Jr. ............ 210/750 |
| 6,126,842 | A | 10/2000 | Decker |
| 2003/0205135 | A1 | 11/2003 | McNulty |
| 2003/0205136 | A1 | 11/2003 | MNulty |

OTHER PUBLICATIONS

McMahon et al, Effects of Elevated Carbon Dioxide Concentrations on Survivorship in Zebra Mussels(*Dreissena polymorpha*) and Asian Clams(*Corbicula fluminea*), Feb. 1995, abstract and graphs and tables.*

Bizer, John R, Product Level Integration for Maintaining Aquatic Biodiversity, Oct. 10, 1997, pp. 1-10.*

SNAME Transactions, vol. 104, 1996, John W. Boylston, "Ballast Water Management for the Control of Nonindigenous Species", p. 391-p. 417, see especially p. 403-408.

Marine Ecology Progress Series, vol. 168, 1998, Gustaaf M. Hallegraeff, "Transport of toxic dinoflagellates via ships' ballast water: bioeconomic risk assessment and efficacy of possible ballast water management strategies", p. 297-p. 308, see especially p. 304-307.

* cited by examiner

PROCESS AND APPARATUS FOR THE CONTROL OF UNDESIRABLE ORGANISMS IN A WATER SYSTEM

This application is a continuation application of U.S. application Ser. No. 10/130,209 filed Jul. 1, 2002 now U.S. Pat. No. 6,921,488, which is a national stage filing under 35 U.S.C. §371 of PCT/NO00/00385, filed Nov. 15, 2000, which claims priority under 35 U.S.C. §119 to foreign application 19995582 (Norway), filed Nov. 15, 1999. The disclosures of all of the above-identified applications are hereby incorporated by reference in their entireties.

The present invention relates to the treatment of water systems containing potentially undesirable organisms, and more particularly to a method and apparatus for treating such water systems to kill undesirable organisms.

A preferred embodiment of the present invention relates to the treatment of ships' ballast water to kill potentially undesirable organisms in said water to prevent them from being transported from one coastal area to another.

As stated above, the invention relates to water systems in general, but as ships' ballast water is recognized internationally as a vector for the translocation of invasive marine organisms to environments where they do not belong, the description below mainly concerns the treatment of such ballast water systems.

A number of studies aimed at finding ways to reduce the risk of introducing marine pests via ballast water have been conducted, but so far, ecologically acceptable or economically feasible solutions have not been obtained.

When a ship unloads cargo in a foreign port, the resulting empty holds of the ship are often filled with the local water as ballast to stabilize the ship. When arriving at another port to take on replacement cargo, the ship typically discharges the prior local, that has now become foreign, ballast water into the coastal waters in or near the second port, thereby introducing nonindigenous organisms such as Crustaceans, Polychaete annelides, tubellarian flatworms, cnidarians and molluscs. Even fishes have been encountered (Carlton, T. C, et. al., Science, Vol. 261:78–82, 1993). Of the algal groups, diatoms predominate, while dinoflagellates have been found. As could be expected, bacteria and vira are also present in the ballast water. This translocation of organisms may have a deleterious (or at least an unknown) effect on the ecosystem of the receiving coastal waters.

At present only a few non-chemical control options seem readily available, such as ballast water uptake management, mid-ocean exchange of ballast water where the ballast water is replaced by oceanic water, and the ability to reduce ships permission to discharge. The effectiveness of managing the uptake of ballast water is limited by the ballasting requirement of ships. There are two methods of mid-ocean ballast exchange; reballasting and ballast dilution (flushing). Reballasting is considered by the shipping industry to be dangerous for may ships. Ballast dilution is a safer operation, but less efficient. To ensure a reasonable efficiency, each tank must be flushed with water corresponding to 3–4 times its own volume. This implies increased cost of operations (fuel and manpower) in addition to significant shorter life span of ballast water pumps.

Due to high harbor fees, and time-dependent running costs of operation, a treatment process which can be conducted during the ballasting, or while the ship is en route or during the discharge of the ballast water is favorable.

Besides the noted ballast water management options, the only non-chemical option for en route treatment, at present, is heat treatment using the waste heat from the ships' engines, which has been shown to be effective against many plankton organisms. The effectiveness will however be dependent on the ambient sea temperature through which the ship travels. The cost of implementing such a method seems prohibitively high with the current technological development.

This option, and further possible treatment processes are described in a report from Ecoports (Oemchke, D (1999), <<The treatment of ships' ballast water>>, Ecoports Monograph Series No. 18 (Ports Corporation of Queensland, Brisbane)).

The above indicated publication discloses that clarification by filtration or cyclonic separation may have a potential for ballast water treatment. These systems will not be effective for smaller organisms, so secondary treatment will be necessary. Use of UV irradiation and high power ultrasound has been suggested as possible secondary treatment methods. Further, it has been proposed to use chemicals such as chlorine dioxide and ozone known from conventional water treatment technology.

The basic concept of the present invention, i.e, to subject aquatic organisms to gas supersaturated water has to our knowledge not been used or proposed as a method for the treatment of ballast water, or any other kind of water systems.

Several publications describe treatment systems for ballast water. U.S. Pat. No. 5,192,451 discloses a method of controlling the growth of zebra mussels in ship ballast water by adding a polymer to the ballast water. U.S. Pat. Nos. 5,376,282 and 5,578,116 disclose the use of a vacuum and agitation for reducing the dissolved oxygen of natural source water specifically to a level below that sufficient to support the survival respiration of zebra mussels. U.S. Pat. No. 3,676,983 discloses an apparatus including a vacuum chamber and an agitator for removing gases from a liquid. U.S. Pat. No. 4,316,725 discloses several methods, including the use of a vacuum, to remove dissolved oxygen from water. U.S. Pat. No. 3,251,357 discloses injecting combustion/stack gases into water for treating the water to inhibit the growth of, e.g., micro-organisms.

The main object of the present invention is to provide a method and an apparatus which solve the above indicated problems, i.e. the unwanted spreading of biological material by ships' ballast water.

The basic concept of the present invention is to establish a condition of gas super-saturation in said water. We will later in this specification document that gas super-saturation of sufficient level is lethal to various and quite diverse systematic groups of organisms, and it is anticipated that such a condition effectively will kill a substantial population of the organisms present in said water.

The method and apparatus of the present invention can be used separately or in combination with other treatment regimes such as heat treatment, treatment with chemicals and so forth.

In addition to the above indicated publications for the treatment of ballast water systems, several publications describe methods for the destruction of biological material, and particularly micro-organisms.

DE 422074 describes a process for the inhibition of corrosive activity of sulphur bacteria by providing an aerobic environment.

DE 2733000 describes a process for the disintegration of micro-organisms wherein an aqueous suspension is supplied with a compressed gas. The suspension is guided through a disintegration means by which the rapid drop in pressure destroys the cell structure.

WO 98/46723 describes a method for disrupting microorganisms which produce gaseous metabolic products, and U.S. Pat. No. 5,816,181 describes a treatment system for ballast water wherein the water is heated to a temperature sufficient to kill the micro-organisms.

The concept of super-saturation of a water system with a gas is based on the findings that a super-saturated condition is harmful to most aquatic organisms.

An essential feature of the method and apparatus of the present invention is thus to establish a level of gas super-saturation in said water system sufficient to kill the unwanted organisms.

More specifically, the present invention relates to how the introduction of surplus gas into a water system at pressure higher than 1 atm., establishing a sufficient super-saturated level for a sufficient period of time to kill nearly all of the unwanted organisms in said water.

The amount of gas that can be dissolved into water, the saturation concentration, is linearly proportional to the partial pressure of the gas in the air, as described by Henry's law.

A super-saturated condition is in the present application defined as a concentration of dissolved gas above the equilibrium concentration of gas at 1 atm. pressure. Such a system is thermodynamically not at equilibrium, and the concentration of gas over time will change due to the flux over the gas-water interface(s).

Such mass transfers are predominantly due to three factors; 1) the level of turbulent mixing, 2) the amount of surface area available for gas transfer, and 3) the residence time of gas bubbles in said water.

Thus, preferred embodiments of the present invention relates to systems, such as a ships water ballast tanks, constructed to decrease the rate of mass transfer, i.e. to maintain the super-saturated condition as long as possible. Such tanks may for instance have a small air-water interface.

When fish are exposed to gas supersaturated water they may experience gas bubble disease. Gas bubble disease is potentially fatal and commonly recognized by the appearance of bubbles or blisters under the skin. The Environmental Protection Agency (EPO) has recognized this threat to fish and has set water quality standards for dissolved gas levels at 110% of saturation. Gas super-saturation will also be detrimental and finally mortal to other organisms, such as the molluscs *Mya arenaria* at 114% saturation (Bisker, R. et. al., The effect of various levels of air-supersaturated seawater on *Mercenaria mercenaria* (Linne), *Mulinia lateralis* (Say), and *Mya arenaria* Linne, with reference to gas-bubble disease, (Journal of Shellfish Research, vol 5, no 2, pp 97–102, 1985.), and *Argopecten irridans concentricus* at 116% (Bisker, R. et. al., The effect of air-supersaturated sea-water on *Argopecten irradians* (Lamarck) and *Crassostrea virginica* (Gmelin) with reference to gas bubble trauma, Journal of Shellfish Research, vol 7, no 1, p150, 1988), subadults of the saltwater tilapia *Oreochromis spilurus* at 111.2 to 113.4%, (Saeed, M O., et. al., Gas bubble disease in farmed fish in Saudi Arabia, Veterinary Record, vol 140, no 26, pp 682–684, 1997), larvae of the white sturgeon *Acipenser transmontanus* at 131% (Counihan T. D. et al., The effects of dissolved gas supersaturation on white sturgeon larvae, Transactions of the American Fisheries Society, vol. 127, no. 2, pp. 316–322, 1998) and adult bullfrog *Rana catesbeiana* at 132.9% (Colt J. et. al., Gas bubble trauma in the bullfrog *Rana catesbeiana*, Journal of the World Aquaculture Society, vol. 18, no. 4, pp 229–236, 1987).

Thus, an embodiment of the present invention relates to a method for treating water systems wherein a pressurized gas is introduced into the water, establishing a dissolved gas level of more than 120%, more preferable 140%, and most preferable over 160%, i.e. levels of super-saturation which will cause mortality to the organisms in said water.

The principle of the invention has been described in relation to the treatment of ballast water. However, the growth of various organisms is also a problem in other water systems.

Cooling water systems are liable to colonization by aquatic organisms (bio-fouling). It is important to take action to prevent mussels, oysters, barnacles and other "pests" such as slim forming bacteria becoming established, since bio-fouling can cause serious problems. If fouling goes unchecked, cooling water flows can be reduced to an inadequate level, undue load placed on circulation pumps or condensers, and heat exchangers blocked by shells. Fouling leads ultimately to production losses, equipment damage and high maintenance costs. Bio-fouling has normally been controlled by adding chlorine, in the form of sodium hypochlorite, or by a temporary heating of the cooling water.

The majority of the fouling problems in cooling waters are caused by three species of mussels, the marine mussel *Mytilus edulis*, the brackish water mussel *Mytilopsis leucophaeata* and the fresh water mussel *Dreissena polymorpha*.

It is anticipated that the present invention will also be effective in the treatment of cooling waters in, e.g. power generation, and also other water industrial and municipal usage of water.

It is preferred that the method of the present invention is practiced using the invention in all its many embodiments as described above. In addition to the novel features and advantages mentioned above, other objects and advantages of the present invention will be readily apparent from the following description of the drawings and preferred embodiments.

EXAMPLE 1

Measuring the Effect of Gas Super-saturation

Figure 1:
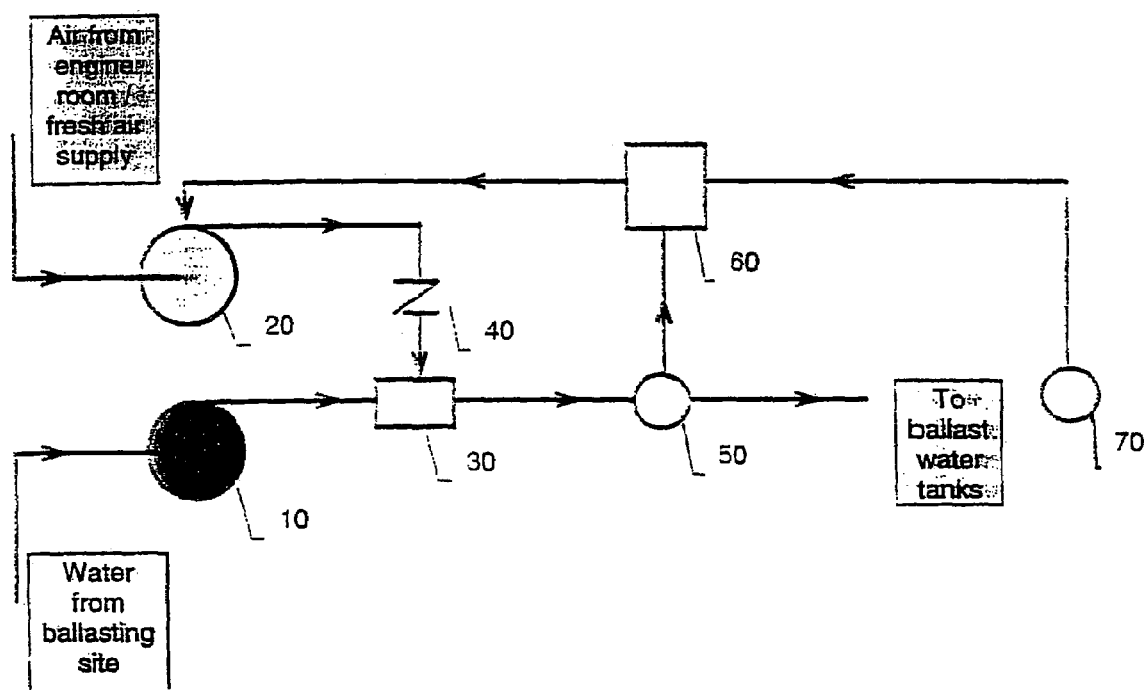
FIG. 1 shows an apparatus for the treatment of ballast water.

The main biocidal effects of the treatment is believed to be the biological effects of an imposed gas super-saturation in water and subsequent release of said super-saturation. The release of the supersaturation will be the passive movement back to saturation equilibrium, governed by the atmospheric pressure, temperature, surface area and turbulence of the water mass, e.g. from sloshing in upper part of tank.

The water to be treated is transported through a pump creating a pressure higher than ambient at surface waters. At the pressurized side of the pump, a gas compressor delivers compressed gas, optionally through a diffusor, into the water stream.

The gas diffusor will ensure three important functions:
1) Producing a large surface area facilitating a rapid mass transport of gas into the water, thus reducing the contact time needed for establishing super-saturation.
2) Creating numerous small gas bubbles facilitating the flotation of various shell-bearing organisms where bubbles can be entrapped in the shells.

3) Creating a large hydrophilic/hydrophobic surface area where hydrophobic bacteria are transported to, and enriched in the surface layers where they can enhance the degradation of floateted organisms.

Various gases can be utilized for this purpose, but as air is both ubiquitous and for free, air would be the natural choice for most applications. For special applications, other gases such as nitrogen might be used.

A MosselMonitor® has been developed by KEMA, and this enables us to accurately record the mussels' valve activity. By attaching sensors to the mussels, we can keep a record of what the mussels behavior are underwater. This model system will be used to determine the effect of various levels of super-saturation on the zebra mussel *Dreissena polymorpha*.

Another relevant test model would be various life stages of the brine shrimp *Artemia* sp.

The concentration of dissolved gas were measured using a total dissolved gas meter, e.g. Common sensing TBOC-L meter.

EXAMPLE 2

The Effect of Air Supersaturation on Naupilus Larvae of *Artemia* sp.

Materials and Methods.

*Artemia* naupleii cysts were hatched and enriched with 0.2 gram DC DHA Selco enrichment pr liter of culture (Both cysts and enrichment: INVE Aquaculture, Hogveld 91 Denermunde, Belgium) the day following hatching. The culture was grown in seawater at 34.7 ppt, at 26° C. in 250 l tanks. The naupleii were harvested, concentrated and stored in a 70 l tank with aeration and oxygenation at a density of 1100 naupleii pr ml. Temperature in the storage tank was 14° C. Two ml of *Artemia* naupleii (i.e., approximately 2200) was collected from the storage tank and distributed in each of two tanks of stainless steel filled with 22 liter of seawater (34.7 ppt). The tanks have a total volume of 26 liter and temperature throughout the experiment was kept at 12.5±0.5° C. One unit was subjected to gas supersaturation and one unit served as control.

The experimental unit were supplied with a tube delivering pressurized air (Fini type Big pioneer 255, Zola Predosa Bo, Italy) through a ceramic diffusor (Birger Christensen P. O. box 13, -1309 Rud, Norway), a pressure gauge and an outlet with a valve. The control unit were supplied with an air supply and an outlet.

When the naupleii were distributed, the units were closed, and compressed air at 3 bar was delivered to the diffusor. As the pressure built in the unit, the outlet valve was regulated to give a pressure of 1 atm above ambient. The outlet gas was led through a tube into a beaker of water aiding inspection of flow, as well as facilitating the measurements of airflow through the system. In the control unit, the pressure was kept at ambient, and air was supplied at the same flow as in the experimental unit.

The naupleii were kept in the units for 18 h, and when the experiment was terminated, the outlet valve was adjusted to release the pressure to give ambient pressure after one hour.

The gas super-saturation was measured by a Weiss saturometer (Eco Enterprises, Seattle, Wash., USA) before sampling commenced.

For each hour following the pressure release, 11 batches of water from the units were collected trough a sieve (80 μm mesh size) in triplicate, and the number of *Artemia* naupleii was observed in a binocular microscope. Naupleii unable to move, or in obvious degradation were scored as dead as opposed to moving individuals. Results are given in Table 1.

Results:

Nitrogen supersaturation was calculated to 119% after adjustment for Bunsen coefficient temperature, salinity and oxygen saturation.

TABLE 1

Number of naupleii recovered from the tanks in the 6 hours following the release of the pressure. An * denoted a complete sampling of the remaining 6 liter seawater.

| Control tank (n at t = 0:2171) | | | Super-saturation tank (n at t = 0:2149) | | |
|---|---|---|---|---|---|
| Alive | Dead | Total | Alive | Dead | Total |
| 115 | 15 | 130 | 90 | 19 | 109 |
| 171 | 10 | 181 | 73 | 22 | 95 |
| 120 | 3 | 123 | 70 | 10 | 80 |
| 90 | 4 | 94 | 30 | 4 | 34 |
| 204 | 15 | 229 | 107 | 18 | 125 |
| 409* | 57* | 466* | 303* | 86* | 389* |
| Σ 1109 | 104 | 1223 | 673 | 159 | 832 |

The number of naupleii recovered in the control unit was 1109 after the experiment, which represents 56.3% of the initial number of naupleii added. In the super saturation unit, the number of naupleii recovered was 832, which represents 38.7% of the initially added naupleii (Table 1).

The number of naupleii recovered alive in the two units were 1109 from the control unit and 673 in the supersaturation unit, which corresponds to 51.1 and 31.3% on initial numbers, respectively.

While the initial numbers of naupleii was slightly different in the two units, it should be possible to test a null hypothesis of no difference between the treatments.

The difference of the supersaturated unit is significantly different from the control unit at the p=0.001 level according to the Chi squared test.

We thus conclude that the exposure of air super-saturation of up to 119% for 20 hours increases the mortality of *Artemia* naupleii significantly (p=0.001 Chi squared).

EXAMPLE 3

Apparatus for Ballast Water Treatment

FIG. 1 shows a schematic set-up of a treatment system for ballast water. The embodiment shown in FIG. 1 is added to existing ballast water systems on the ship. Ballast water is taken from outside the ship and is pumped through the ships' own ballast pump 10. An air compressor 20 delivers compressed air through a diffusor 30 into the ballast water stream at the pressurized side of the ballast water pump. A backflushing valve 40 prevents pressurized water from entering the air compressor 20. En route to the ballast tanks, a meter for super-saturation 50 reports to a controller/logging PLS, which controls the air compressor 20. Optionally, a super-saturation meter 70 in the ballast tanks may report to the PLS. The proposed treatment system can easily be installed in existing ships (retrofitted).

Figure 2:
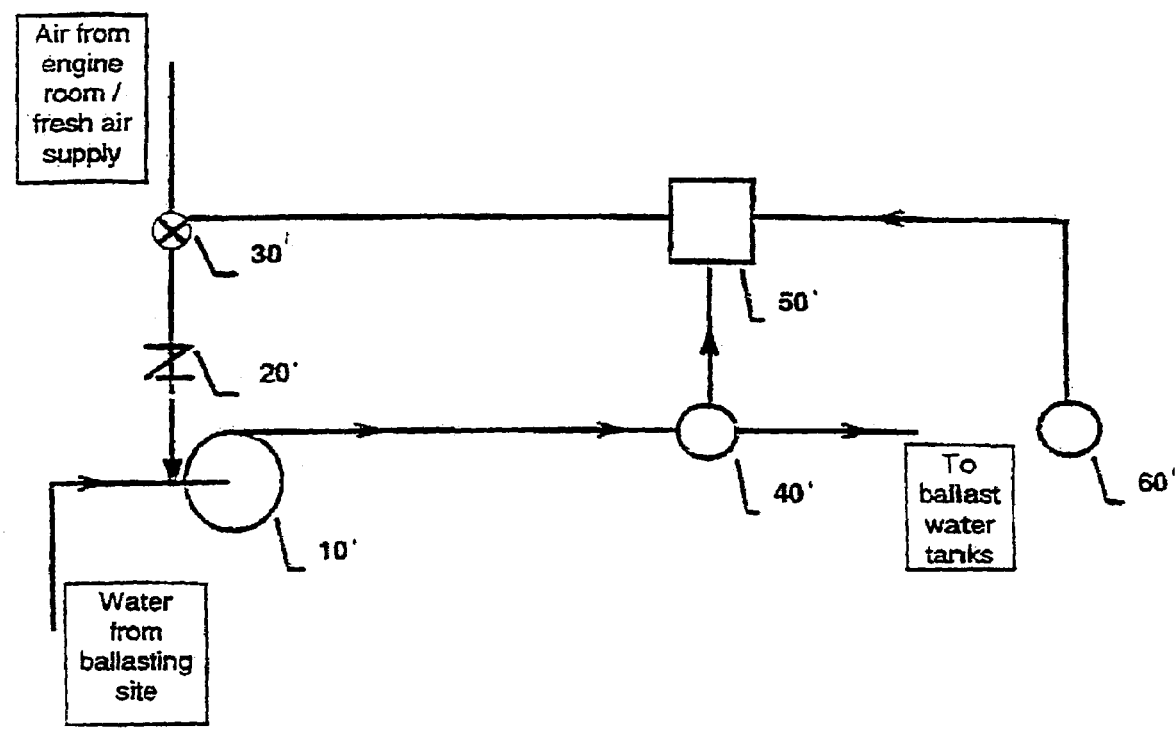
FIG. 2 shows an alternative embodiment of an apparatus for the treatment of ballast water.

Alternatively, as shown in FIG. 2, if the pump exerts sufficient suction before the centrifugal head, air can be let into the water flow by this suction alone, through an air inlet from above the water surface.

This system can also easily be added to the existing ballast water system of the ship. Ballast water is pumped through the ship's own ballast pump 10'. Air is supplied either through a pipe entering from over sea surface level, or from the machine room. Preferably, the air is entered at the suction side of the pump. A backflush valve 20' prevents the overflow of water into the machine room or piping if higher pressure than ambient air pressure should occur in the water flow. En route to the ballast pump, a meter 40' for super saturation reports to a controller loging PLS 50', controlling an air regulating valve 30'. Optionally, supersaturation meters 60' in the ballast tanks may report to the PLS.

EXAMPLE 4

Ballast Tank

Figure 3:
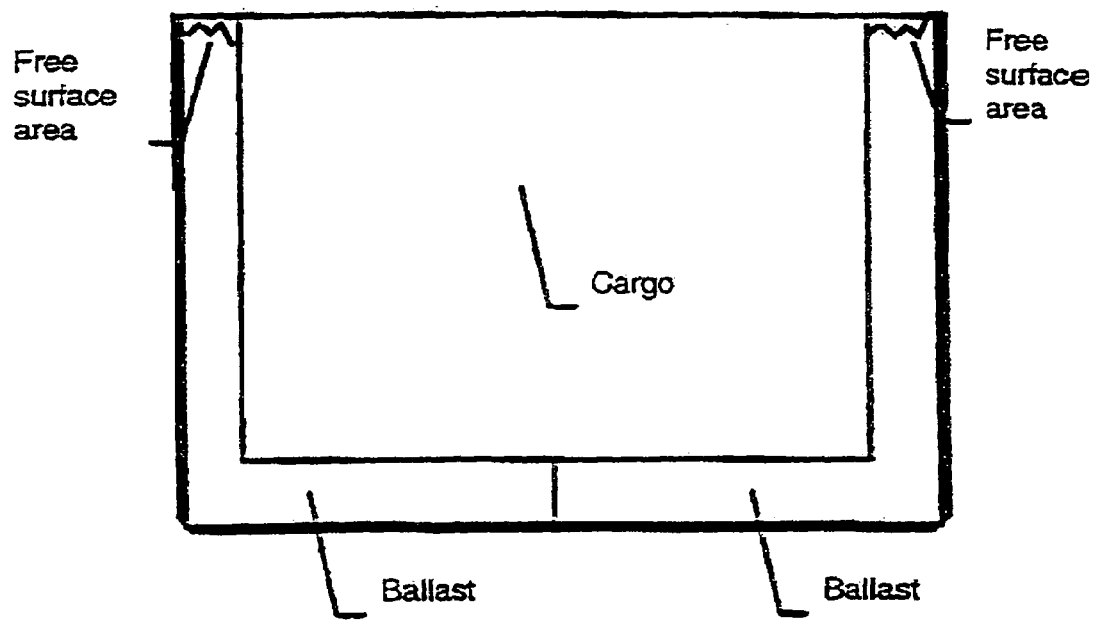
FIG. 3 shows in a cross section a ballast tank.

FIG. 3 shows a cross section of a modern tank vessel. Supporting structural components are omitted for the sake of clarity. The surface area are relatively small 25 compared to the volume of the ballast water, thus ensuring a slow exchange of gas over the air/water surface.

EXAMPLE 5

Treatment System for Cooling Water Systems

Figure 4:
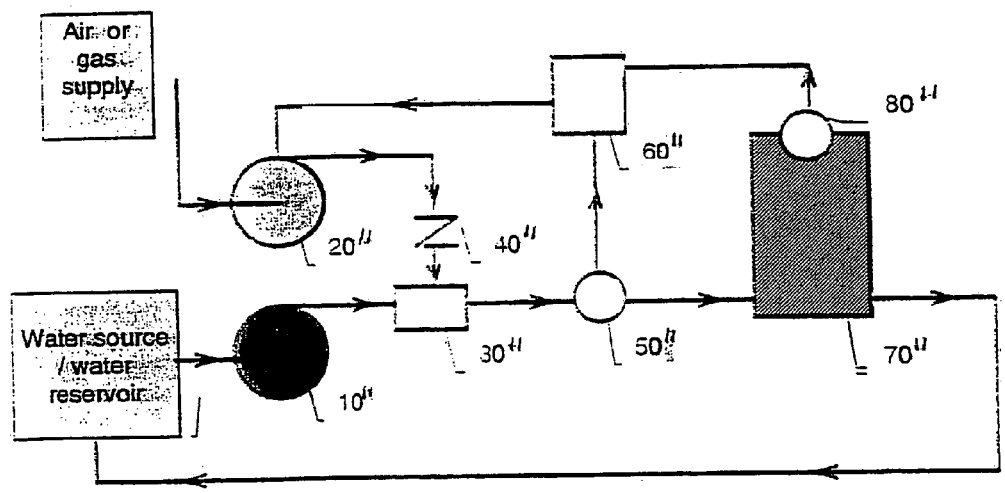
FIG. 4 shows an apparatus for the treatment of industrial water, such as cooling water.

FIG. 4 shows a treatment apparatus for industrial water usage, e.g. cooling water. The system can use a dedicated pump 10", or be fitted into the existing water pump. An air compressor 20" delivers compressed air through a diffusor 30" into the water stream at the pressurized side of the water pump. A back-flushing valve 40' prevents pressurized water from entering the air compressor. En route to the industrial application 70", a meter for super-saturation 50" reports to a controller/logging PLS 60", controlling the air compressor. A super-saturation meter 80" in the industrial application 70" may report to the PLS. The water may be recycled back to the reservoir.

What is claimed:

1. A process for killing an organism in a water system, said process comprising introducing a gas into the water system in an amount sufficient to establish a supersaturated condition, wherein the amount of gas is at a level of more than 110%, relative to the saturation level for said gas at 1 atm pressure, thereby killing the organism, wherein the water system includes a ballast tank of a ship.

2. The process of claim 1, wherein said gas is a pressurized gas.

3. The process of claim 1, wherein said gas is introduced into said water system under suction.

4. The process of claim 1, wherein the amount of gas is at a level of at least 111%, relative to the saturation level for said gas at 1 atm pressure.

5. The process of claim 4, wherein the amount of gas is at a level of at least 114%, relative to the saturation level for said gas at 1 atm pressure.

6. The process of claim 5, wherein the amount of gas is at a level of at least 116%, relative to the saturation level for said gas at 1 atm pressure.

7. The process of claim 1, wherein the gas supersaturated condition in said water system is maintained for more than 1 hour.

8. The process of claim 7, wherein the gas supersaturated condition in said water system is maintained for more than 12 hours.

9. The process of claim 1, wherein said gas is air.

10. The process of claim 1, wherein said gas is nitrogen.

11. The process of claim 1, wherein the supersaturation condition causes gas bubble disease in the organism.

12. A process for killing an organism in a water system, said process comprising introducing a gas into the water system in an amount sufficient to establish a supersaturated condition for a duration of time sufficient to cause gas bubble disease in the organism, thereby killing the organism, wherein the water system includes a ballast tank of a ship.

13. The process of claim 12, wherein said gas is a pressurized gas.

14. The process of claim 12, wherein said gas is introduced into said water system under suction.

15. The process of claim 12, wherein the amount of gas is at a level of more than 110%, relative to the saturation level for said gas at 1 atm pressure.

16. The process of claim 15, wherein the amount of gas is at a level of at least 111%, relative to the saturation level for said gas at 1 atm pressure.

17. The process of claim 16, wherein the amount of gas is at a level of at least 114%, relative to the saturation level for said gas at 1 atm pressure.

18. The process of claim 16, wherein the amount of gas is at a level of at least 116%, relative to the saturation level for said gas at 1 atm pressure.

19. The process of claim 12, wherein the gas supersaturated condition in said water system is maintained for more than 1 hour.

20. The process of claim 19, wherein the gas supersaturated condition in said water system is maintained for more than 12 hours.

21. The process of claim 12, wherein said gas is air.

22. The process of claim 12, wherein said gas is nitrogen.

23. An apparatus for treatment of a ship's ballast water, said apparatus comprising:
   a pump for generating a pressurized ballast water stream;
   a gas compressor for delivering a compressed gas into the ballast water stream in an amount sufficient to establish a supersaturated condition in the ballast water stream;
   a meter for measuring the level of supersaturation in the ballast water;
   a controller for receiving a signal from said meter indicative of the measured level of supersaturation in the ballast water, the controller being in communication with the gas compressor to control the delivery of the gas into the ballast water stream; and
   a ballast tank.

24. The apparatus of claim 23, wherein the pump is an existing ballast pump on the ship.

25. The apparatus of claim 23, wherein the ballast water is taken from outside the ship.

26. The apparatus of claim 23, further comprising a diffusor through which the compressed gas is delivered into the ballast water stream.

27. The apparatus of claim 23, wherein the meter is located outside the ballast tank.

28. The apparatus of claim 23, further comprising a valve for preventing pressurized water from entering the gas compressor.

* * * * *